United States Patent [19]

Ogata et al.

[11] Patent Number: 5,099,334
[45] Date of Patent: Mar. 24, 1992

[54] ELECTRONIC STILL CAMERA

[75] Inventors: Kazutsugu Ogata; Kazuhisa Seki; Kouji Kaneko; Satoshi Mikajiri, all of Omiya; Kiyotaka Kaneko, Tokyo, all of Japan

[73] Assignee: Fuji Photo Film Co., Ltd., Kanagawa, Japan

[21] Appl. No.: 406,544

[22] Filed: Sep. 13, 1989

[30] Foreign Application Priority Data

Sep. 14, 1988 [JP] Japan .................. 63-228534

[51] Int. Cl.5 ................. H04N 5/238; H04N 5/225
[52] U.S. Cl. ..................... 358/228; 358/225; 359/271.1
[58] Field of Search ............ 358/227, 213.19, 225, 358/228, 209, 909, 55; 354/226, 233, 250, 253, 254, 230, 234.1, 235.1, 272, 271.1, 410, 232

[56] References Cited

U.S. PATENT DOCUMENTS

| 2,249,972 | 11/1944 | Aiken | 354/254 |
| 2,963,951 | 4/1955 | Wareham | 354/253 |
| 4,301,476 | 11/1981 | Keller et al. | 358/225 |
| 4,571,629 | 2/1986 | Hario et al. | 358/225 |
| 4,626,094 | 12/1986 | Saito | 358/225 |

FOREIGN PATENT DOCUMENTS 0257730 10/1988 Japan ................. 358/228

Primary Examiner—James J. Groody
Assistant Examiner—Safet Metjahic

[57] ABSTRACT

An electronic still camera has a mechanical diaphragm mechanism for controlling the exposure of an image surface. The diaphragm mechanism includes an exposure plate having an opening of an aperture greater than an effective aperture corresponding to an open f-stop value, and at least one opening equal to an effective aperature corresponding to an f-stop value. By shifting the diaphragm plate, it is possible to set at least two types of f-stop values which include the open f-stop value. As a result, a diaphragm function in which effective aperture is made less than 1 mm can be achieved with a high degree of accuracy.

3 Claims, 3 Drawing Sheets

1

ELECTRONIC STILL CAMERA

BACKGROUND OF THE INVENTION

1. Field of the Invention

This invention relates to an electronic still camera (a still-video camera) having a mechanical diaphragm mechanism for controlling the exposure of an image surface.

2. Description of the Related Art

The image sensor which is used as the image pick-up device in an electronic still camera generally has a frame size of 6.6 ×8.8 mm or 4.8×6.4 mm. In terms of the length of one side, this is ¼ to 1/5 of the size (24×36 mm) of the silver chloride film used in ordinary cameras. For this reason, the focal length of the lens used also is proportional to the size of the image pick-up device and therefore is short, thus making it possible to realize a compact lens.

However, since the effective aperture of the diaphragm corresponding to the f-stop value also is small in proportion to the size of the image pick-up device, it is difficult to maintain a high precision with an iris diaphragm that relies upon the diaphragm blades used in a camera of the type that produces an image on silver chloride film. It is especially difficult to realize high precision with an iris diaphragm when the effective aperture is less than 1 mm.

Because high precision cannot be obtained with an iris diaphragm, correcting for an error in exposure requires a control operation which includes performing photometry again after the diaphragm is set and changing shutter speed based on the new photometric value so as to obtain the proper exposure.

SUMMARY OF THE INVENTION

An object of the present invention is to provide a still-video camera having a diaphragm mechanism in which f-stop values of comparatively high precision can be obtained even with a small effective aperture.

In order to attain the foregoing object, the present invention provides an electronic still camera having a mechanical diaphragm mechanism for controlling exposure of an image surface. The diaphragm mechanism comprises a freely moving diaphragm plate formed to have an opening of an aperture greater than an effective aperture corresponding to an open f-stop value and at least one opening equal to an effective aperture corresponding to an f-stop value, and a drive mechanism for displacing the aperture plate, in dependence upon exposure to be controlled, in such a manner that a prescribed opening arrives at a position of an optic axis.

In accordance with the invention, the diaphragm plate of the diaphragm mechanism is formed to have openings of a fixed size. This means that the precision thereof is decided by the precision of machining, thus enabling a comparatively high precision to be obtained. Because the diaphragm plate is formed to include at least two openings one of which corresponds to an open f-stop value, it is possible to set a total of at least two types of f-stop values, namely the open f-stop value and the other f-stop value, of which there is at least one. In addition, because an opening having a diameter of less than 1 mm can be formed to have a high precision, it is possible to deal with an effective aperture having a diameter of less than 1 mm so that highly accurate exposure control can be performed. For example, photography having highly precise reproducibility and exposure is possible even when taking pictures using an automatic strobe which controls the diaphragm automatically upon performing photometry or a manual strobe which sets the diaphragm manually.

Figure 5:
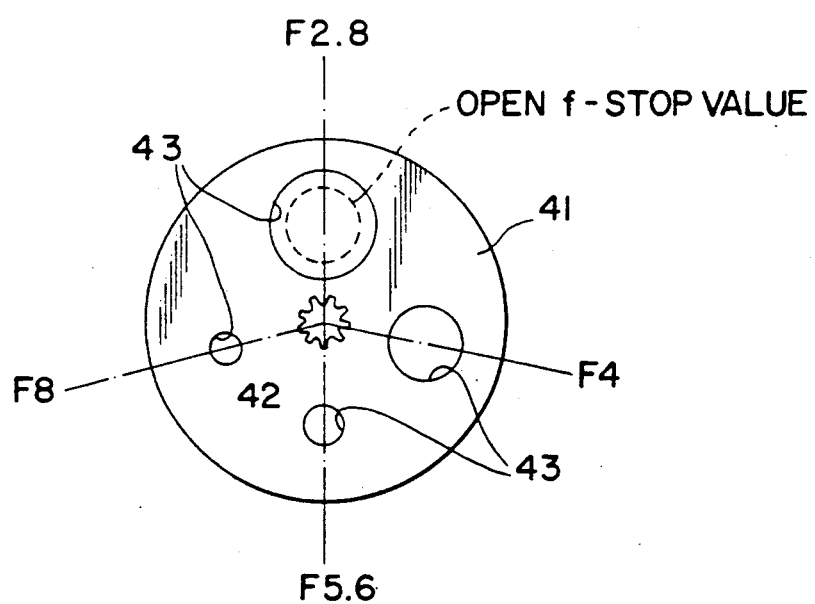

The present invention will become more fully understood from the detailed description given hereinbelow and the accompanying drawings which are given by way of illustration only, and thus are not limitative of the present invention, and wherein;

FIG. 5 is a front view illustrating a diaphragm plate having an opening of an aperture greater than an effective aperture corresponding to an open f-stop value.

DESCRIPTION OF THE PREFERRED EMBODIMENT

Figure 1:
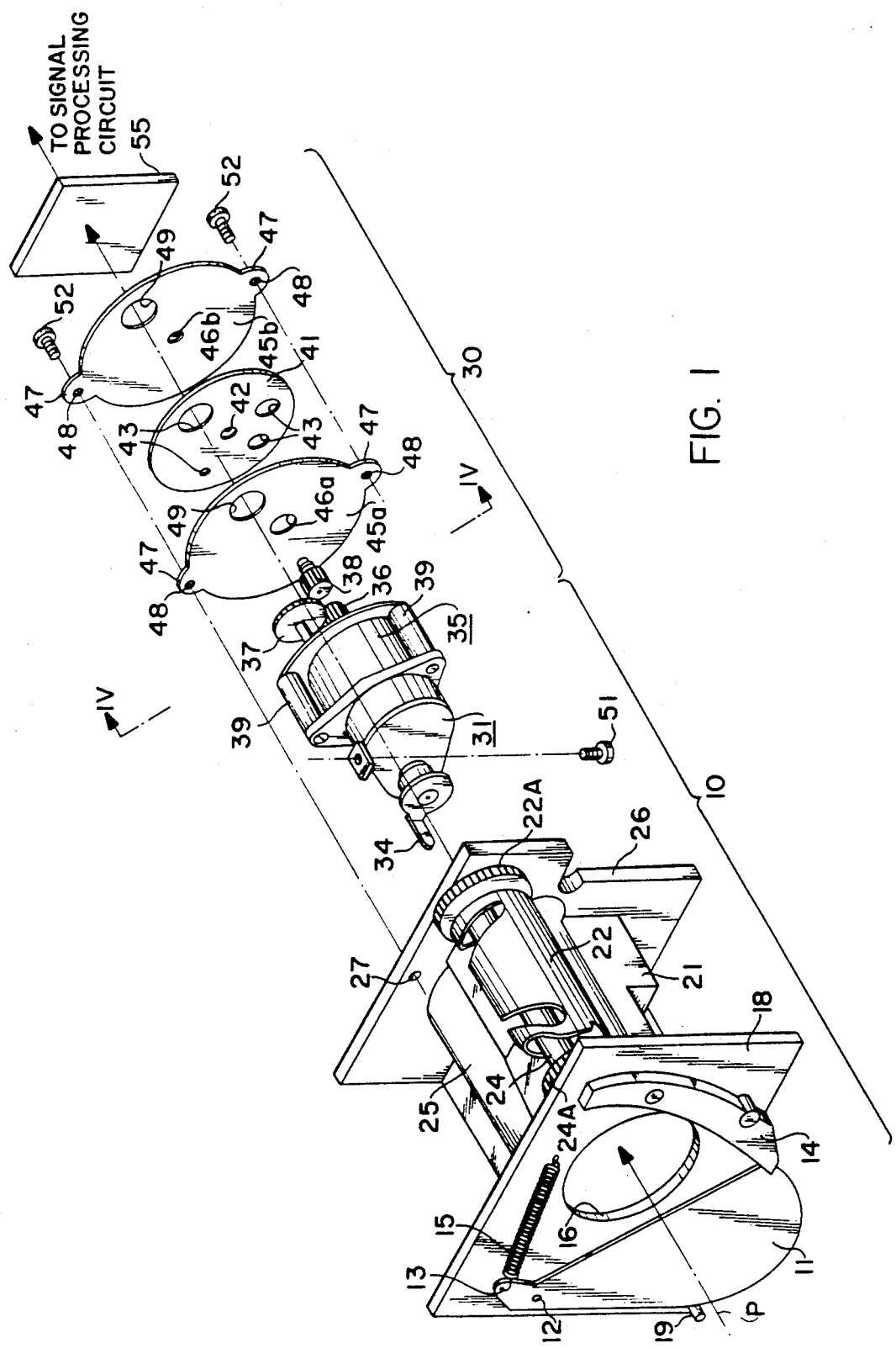
FIG. 1 is a perspective view illustrating the assembly of the image pick-up optical system of an electronic still camera.

FIG. 1 is a perspective view illustrating the assembly of the image pick-up optical system of an electronic still camera. The image pick-up optical system mainly includes a lens barrel unit 10, a diaphragm unit 30 and a solid-state electronic image pick-up device 55.

The lens barrel unit 10 includes a lens barrel 25 having frame plates 18, and which 26 are secured in the front and back thereof. The lens barrel 25 includes a zoom lens system and an image pick-up lens system. These lens systems have their zoom magnification and focusing adjusted by cams 22, and 24 driven by drive motors (not shown) via gears 22A, and 24A.

A barrier 11 for protecting the lenses is provided on the front side of the frame plate 18. The barrier 11 is retained by a pin 12 so as to be rotatable on the plate 18. The barrier 11 has an end portion 13 tensioned at all times by a spring 15 fixed to the plate 18. The portion at he other end of the barrier 11 abuts against a stopper 19 provided on the plate 18, whereby the barrier 11 is held in the open state (the state illustrated in FIG. 1). The plate 18 is provided also with a barrier guide 14 which limits the movement of the barrier 11. A pedestal 21 provided between the plates 18 and 26 has a lower portion to which a reduction gear block 31, which is coupled to the output shaft of a diaphragm motor 35, is secured by a screw 51. An engaging portion 34 provided on the output shaft of the reduction gear block 31 is engaged with a portion of the barrier 11 so that the barrier 11 is closed by the rotating force of the motor 35.

The diaphragm unit 30 includes the diaphragm motor 35 and diaphragm retaining plates 45a and 45b for diaphragm plate 41. The diaphragm motor 35 is coupled to the reduction gear block 31, which is for opening and closing the barrier 11, by a coupling member 39, whereby the motor 35 is fixedly mounted on the pedestal 21. The one diaphragm retaining plate 45a is disposed in front of the diaphragm plate 41, and the other diaphragm retaining plate 45b is disposed in back of the diaphragm plate 41.

Figure 2:
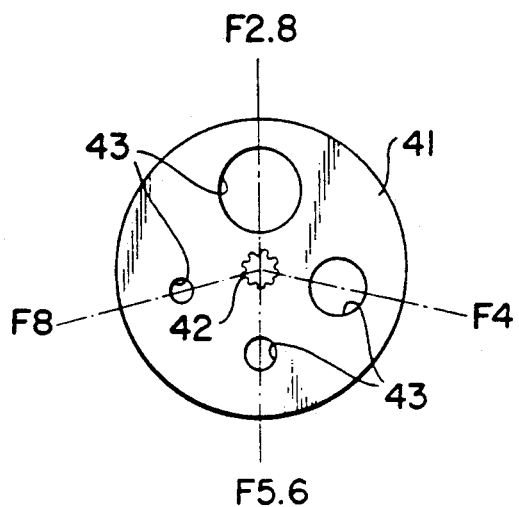
FIG. 2 is a front view illustrating a diaphragm plate.

As illustrated in FIG. 2, the diaphragm plate 41 is disk-shaped and has a center hole 42 formed to include inwardly directed teeth. The periphery of the diaphragm plate 41 is provided with a plurality of openings 43 having predetermined effective apertures that differ from one another. The amount of entrant light is regulated by the sizes of these openings 43. With the diaphragm plate 41 of this embodiment, four types of f-stop values (e.g., F2.8, F4, F5.6 and F8) are capable of being set. One of these openings 43 corresponds to an open f-stop value. This opening has an aperture greater than an effective aperture corresponding to the open f-stop value. This feature is illustrated in FIG. 5. The reason for this is that if the opening were to be one having the effective aperture of the open f-stop value, the f-stop value of the opening would, owing to machining precision, substantially become smaller than the open f-stop value.

Figure 3:
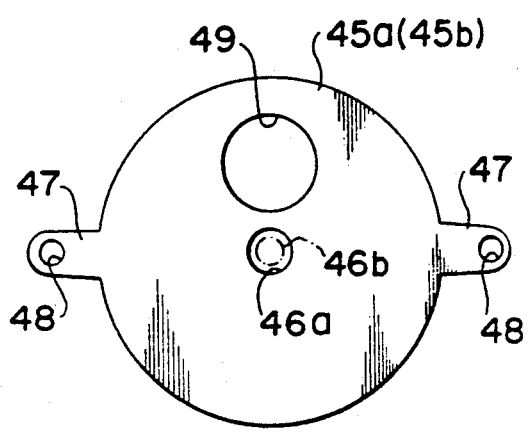
FIG. 3 is a front view illustrating a diaphragm retaining plate.

As illustrated in FIG. 3, the diaphragm retaining plate 45a (45b), which is for retaining the diaphragm plate 41 and holding the diaphragm plate 41 at the proper position, has a hole 46a (46b) at its center and an opening 49 formed at a position offset from the hole 46a (46b) toward the periphery of the plate. (In FIG. 3, the one diaphragm plate 45a is illustrated. The reference numerals regarding the other diaphragm retaining plate 45b are indicated in the parentheses.) The opening 49 is formed at a position with which the openings 43 in the diaphragm plate 41 will register when the diaphragm plate 41 is rotated about the hole 42, and the opening 49 has a diameter greater than the diameter of the largest of the openings 43.

The diaphragm plate 41 is retained so as to rotate freely in a state sandwiched by the two diaphragm retaining plates 45a and 45b. The diaphragm retaining plates 45a and 45b are fixed to the plate 26 by passing screws 52 through screw holes 48, which are provided in projections 47 formed at two locations on the periphery of each of the diaphragm retaining plates 45a and 45b and screwing the screws 52 into screw holes 27 formed in the plate 26.

Figure 4:
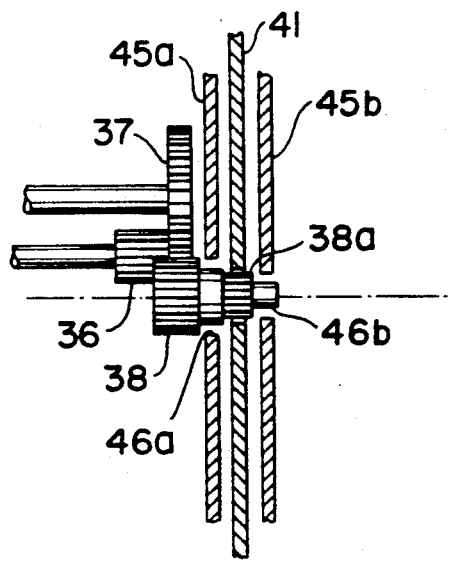
FIG. 4 is an enlarged sectional view taken along line IV—IV of FIG. 1.

Teeth 38a formed on a gear 38 are in meshing engagement with the inner teeth of hole 42 in the diaphragm plate 41. As illustrated in FIG. 4, this gear 38 passes freely and rotatably through the hole 46a of the diaphragm retaining plate 45a. The diaphragm motor 35, which is a stepping motor, has an output shaft which rotates through a predetermined angle in dependence upon the number of pulses applied thereto. A gear 36 is attached to the output shaft of the diaphragm motor 35 so that the rotation of the output shaft of the diaphragm motor 35 is transmitted to the gear 38 via an idle gear 37. The diaphragm plate 41 is rotated to and positioned at a predetermined angular position by the diaphragm motor 35 acting through the gears 36–38.

A solid-state electronic image pick-up device 55 such as a CCD is disposed in back of the diaphragm plate 41.

In the case of automatic exposure control, the diaphragm motor 35 is driven so as to obtain the proper exposure based on the results of photometry. More specifically, the output shaft of the diaphragm motor 35 moves through a prescribed angle in conformity with the number of pulses applied to the diaphragm motor 35. As a result, the diaphragm plate 41 is rotated by the prescribed angle. The diaphragm plate 41 is moved in such a manner that the opening of the plurality of openings 43 that has an effective aperture which will provide an exposure based on the photometric value will arrive at the position of the opening 49 in each of the diaphragm retaining plates 45a and 45b.

When the f-stop is set by the photographer to perform photography, the diaphragm motor 35 is driven based on the set f-stop value to select an opening 43 in the diaphragm plate 41 that will provide the set f-stop value.

When the f-stop has been set, the amount of incident light P is limited by the selected opening 43 before the light is applied to the solid-state image pick-up device 55. Image data conforming to the amount of incident light are stored up by the solid-state image pick-up device 55 and are read out as a serial still-video signal (R, G and B). The video signal outputted by the device 55 enters a signal processing circuit (not shown) and is recorded on a video floppy following execution of matrix or other processing.

In the foregoing embodiment, use is made of a diaphragm disk which enables four types of f-stop values to be set. However, it is possible to set the number of types at will and it is possible to set types of f-stop values conforming to the number of openings in the diaphragm plate.

As many apparently widely different embodiments of the present invention can be made without departing from the spirit and scope thereof, it is to be understood that the invention is not limited to the specific embodiments thereof except as defined in the appended claims.

What is claimed is:

1. An electronic still camera having a mechanical diaphragm mechanism for controlling exposure of an image surface, said diaphragm mechanism comprising:
   a freely moving diaphragm plate formed to have a plurality of openings, said plurality of openings including,
      an opening of an aperture greater than an effective aperture corresponding to an open f-stop value, and
      at least one opening equal to an effective aperture corresponding to an f-stop value; and
   a drive mechanism for displacing said diaphragm plate, in dependence upon exposure to be controlled, in such a manner that one of said plurality of openings arrives at a position of an optic axis.

2. An electronic still video camera having a mechanical diaphragm mechanism for controlling exposure of an image surface, said diaphragm mechanism comprising:
   a freely moving diaphragm plate formed to have a plurality of openings corresponding to f-stop values;
   a pair of diaphragm retaining plates for freely and rotatably supporting said diaphragm plate, each of said diaphragm retaining plates having an opening greater than the openings of said diaphragm plate formed at a position of an optic axis; and
   a drive mechanism for displacing said diaphragm plate, in dependence upon exposure to be controlled, in such a manner that one of plurality of openings arrives at a position of said optic axis.

3. The electronic still video camera according to claim 2, wherein said plurality of openings of said diaphragm plate comprises:
   an opening of an aperture greater than an effective aperture corresponding to an open f-stop value; and
   at least one opening equal to an effective aperture corresponding to an f-stop value.

* * * * *